US012665304B2

(12) United States Patent
Hsu et al.

(10) Patent No.: US 12,665,304 B2
(45) Date of Patent: Jun. 23, 2026

(54) INVERTED F-SHAPED SINGLE-BAND ANTENNA STRUCTURE

(71) Applicants: GRAND-TEK TECHNOLOGY CO., LTD., New Taipei City (TW); RESILIENT TECHNOLOGY CO., LTD., New Taipei City (TW)

(72) Inventors: Kai-Hsiung Hsu, New Taipei City (TW); Chien-Wen Hung, New Taipei City (TW); Jia-Jiu Song, New Taipei City (TW)

(73) Assignees: GRAND-TEK TECHNOLOGY CO., LTD., New Taipei City (TW); RESILIENT TECHNOLOGY CO., LTD., New Taipei City (TW)

( * ) Notice: Subject to any disclaimer, the term of this patent is extended or adjusted under 35 U.S.C. 154(b) by 73 days.

(21) Appl. No.: 18/532,748

(22) Filed: Dec. 7, 2023

(65) Prior Publication Data

US 2025/0192437 A1 Jun. 12, 2025

(51) Int. Cl.
*H01Q 9/04* (2006.01)

(52) U.S. Cl.
CPC ........... *H01Q 9/0414* (2013.01); *H01Q 9/045* (2013.01)

(58) Field of Classification Search
CPC ............................ H01Q 9/0414; H01Q 9/045
See application file for complete search history.

(56) References Cited

U.S. PATENT DOCUMENTS

2010/0045552 A1* 2/2010 Ueki ........................ H01Q 1/52
343/745

* cited by examiner

*Primary Examiner* — Graham P Smith
(74) *Attorney, Agent, or Firm* — HDLS IPR SERVICES; Chun-Ming Shih

(57) ABSTRACT

An inverted F-shaped single-band antenna structure includes a ground terminal, an impedance-matching terminal, a radiation terminal, and a signal feed-in terminal. The ground terminal includes a body. The impedance-matching terminal is bent and extended from the body, and is connected perpendicularly to the body. The radiation terminal is bent and extended from the impedance-matching terminal, and is connected perpendicularly to the impedance-matching terminal, and is arranged correspondingly with the body. The signal feed-in terminal is bent and extended from the radiation terminal, and connected perpendicularly to the radiation terminal, and arranged correspondingly with the impedance-matching terminal, and not connected to the body. A length of the impedance-matching terminal is shortened to increase an area of the radiation terminal and shorten a distance between the ground terminal and the radiation terminal, so the inverted F-shaped antenna structure is arranged inside electronic apparatuses with limited height and space.

11 Claims, 5 Drawing Sheets

INVERTED F-SHAPED SINGLE-BAND ANTENNA STRUCTURE

BACKGROUND

Technical Field

The present disclosure relates to an antenna, and especially relates to an inverted F-shaped (PIFA) single-band antenna structure that reduces the height of the antenna.

Description of Related Art

The development of the wireless communications in recent years has required wireless communication apparatuses (such as smartphones, tablets, laptops, and wireless access points) to not only provide basic communication functions, but also support message exchange, network connection, and other functions using multiple communication protocols. However, as mobile communication apparatuses become increasingly compact in size, how to design an antenna with small size and good radiation effect in a limited space is currently one of the directions of the industry's efforts.

However, in the development of the antenna structures, the application of the inverted F-shaped antenna is more common because of its advantages of simple structure, light weight, relatively low cost, and high radiation efficiency. However, the shape, structure and even size of the antenna structure will significantly affect the impedance matching, operating frequency band, radiation efficiency, and other aspects of the antenna structure.

A related art inverted F-shaped antenna structure 100 is shown in FIG. 1 and FIG. 2. The related art inverted F-shaped antenna structure 100 is made by stamping a metal plate; after being made by stamping, the related art inverted F-shaped antenna structure 100 includes a ground terminal 101. One side of the ground terminal 101 is bent and extended with a signal transmission section (impedance-matching terminal) 102. The signal transmission section 102 extends upward to a radiation terminal 103 and a signal feed-in terminal 104. In the design of the related art inverted F-shaped antenna structure 100, the total height H (length) of the signal transmission section (impedance-matching terminal) 102, the radiation terminal 103, and the signal feed-in terminal 104 is 10 mm or more than 10 mm.

Because the total height (length) of the signal transmission section (impedance-matching terminal) 102, the radiation terminal 103, and the signal feed-in terminal 104 of the related art inverted F-shaped antenna structure 100 is 10 mm or more than 10 mm, in many light, thin, and compact electronic apparatuses with the limited installation space (height) inside the apparatuses, the related art inverted F-shaped antenna structure 100 with the height of 10 mm or more than 10 mm cannot be arranged and used inside the electronic apparatus.

Therefore, how to enable the related art inverted F-shaped antenna structure 100 to be arranged and used inside a light, thin, and compact electronic apparatus is a problem to be solved by the present disclosure.

SUMMARY

Therefore, the main object of the present disclosure is to solve the traditional deficiencies. The present disclosure redesigns the inverted F-shaped antenna structure, and shortens the length of the impedance-matching terminal, and increases the area of the radiation terminal, and shortens the distance between the ground terminal and the radiation terminal, and allows the inverted F-shaped antenna structure to be arranged and used inside the electronic apparatus with the limited height and space.

In order to achieve the object mentioned above, the present disclosure provides an inverted F-shaped single-band antenna structure which includes a ground terminal, an impedance-matching terminal, a radiation terminal, and a signal feed-in terminal. The ground terminal includes a body. The impedance-matching terminal is bent and extended from one side of the body, and is connected perpendicularly to the body. The radiation terminal is square, and is bent and extended from one side of the impedance-matching terminal, and is connected perpendicularly to the impedance-matching terminal, and is arranged correspondingly with (namely, opposite to, or mapping to) the body. The signal feed-in terminal is bent and extended from one side of the radiation terminal, and is connected perpendicularly to the radiation terminal, and is arranged correspondingly with (namely, opposite to, or mapping to) the impedance-matching terminal, and fails to be connected to the body.

In one embodiment of the present disclosure, the body is a rectangular body; the ground terminal further includes two lugs; the two lugs extend respectively from two ends of the body; each of the two lugs defines a perforation; the ground terminal is fixed and connected to a metal sheet through the two perforations. Moreover, the body defines two notches which are respectively on two edges of the body and are symmetric to each other.

In one embodiment of the present disclosure, a groove is defined (or formed) at a connection between the radiation terminal and the impedance-matching terminal; the radiation terminal comprises two side parts which are arranged respectively on two sides of the groove; each of the two side parts defines two symmetrical and U-shaped openings. Moreover, the radiation terminal defines a through hole in a center position of a surface of the radiation terminal.

In one embodiment of the present disclosure, the two side parts are arranged perpendicularly to the impedance-matching terminal.

In one embodiment of the present disclosure, a frequency of a signal of the radiation terminal is 5 GHz or 6 GHz.

In one embodiment of the present disclosure, a (first) operating frequency range of the signal of the radiation terminal with the frequency of the signal being 5 GHz is 5150 MHz to 5850 MHz; a (second) operating frequency range of the signal of the radiation terminal with the frequency of the signal being 6 GHz is 5925 MHz to 7125 MHz.

In one embodiment of the present disclosure, a corresponding distance between the radiation terminal and the ground terminal is about 1 mm to 9 mm.

In one embodiment of the present disclosure, the corresponding distance between the radiation terminal and the ground terminal is about 6 mm.

In one embodiment of the present disclosure, the signal feed-in terminal includes a first signal feed-in terminal; the first signal feed-in terminal is bent and extended from one side of the radiation terminal, and is connected perpendicularly to the radiation terminal, and is arranged on another notch (or one of the two notches) of the body, and is arranged correspondingly with (namely, opposite to, or mapping to) the impedance-matching terminal, and fails to be connected to the body of the ground terminal, and includes an oblique edge part on one side of the first signal feed-in terminal.

In one embodiment of the present disclosure, the signal feed-in terminal further includes a second signal feed-in terminal; the second signal feed-in terminal is bent and extended from one side of the body of the ground terminal, and is connected perpendicularly to the body, and is located on a same side with the first signal feed-in terminal, and is adjacent to the oblique edge part.

DETAILED DESCRIPTION

Figure 1:
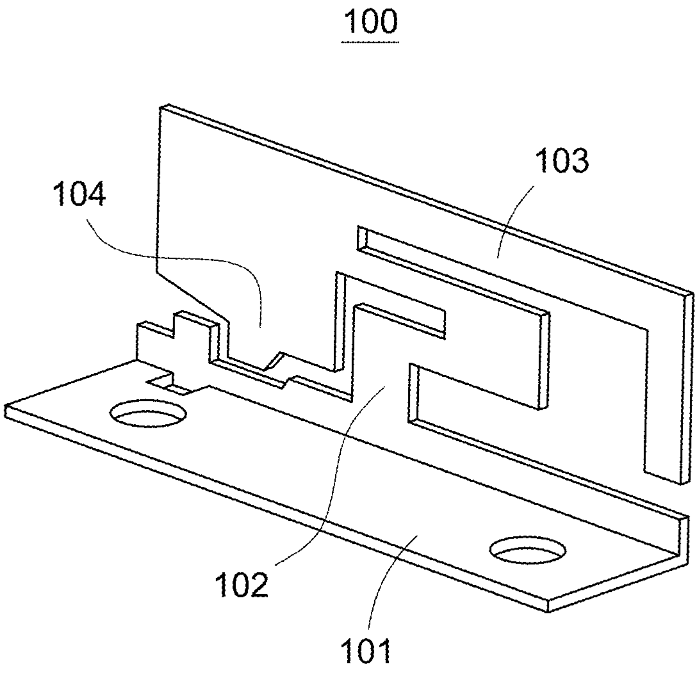
FIG.1 (Related Art)
FIG. 1 shows a three-dimensional schematic diagram of the related art inverted F-shaped antenna structure.
Figure 2:
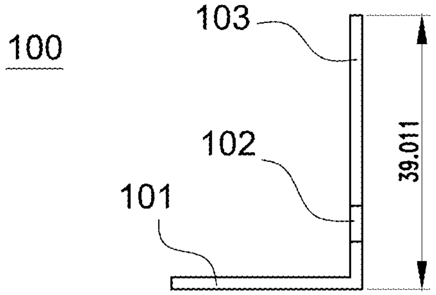
FIG.2 (Related Art)
FIG. 2 shows a schematic side view of FIG. 1.
Figure 3:
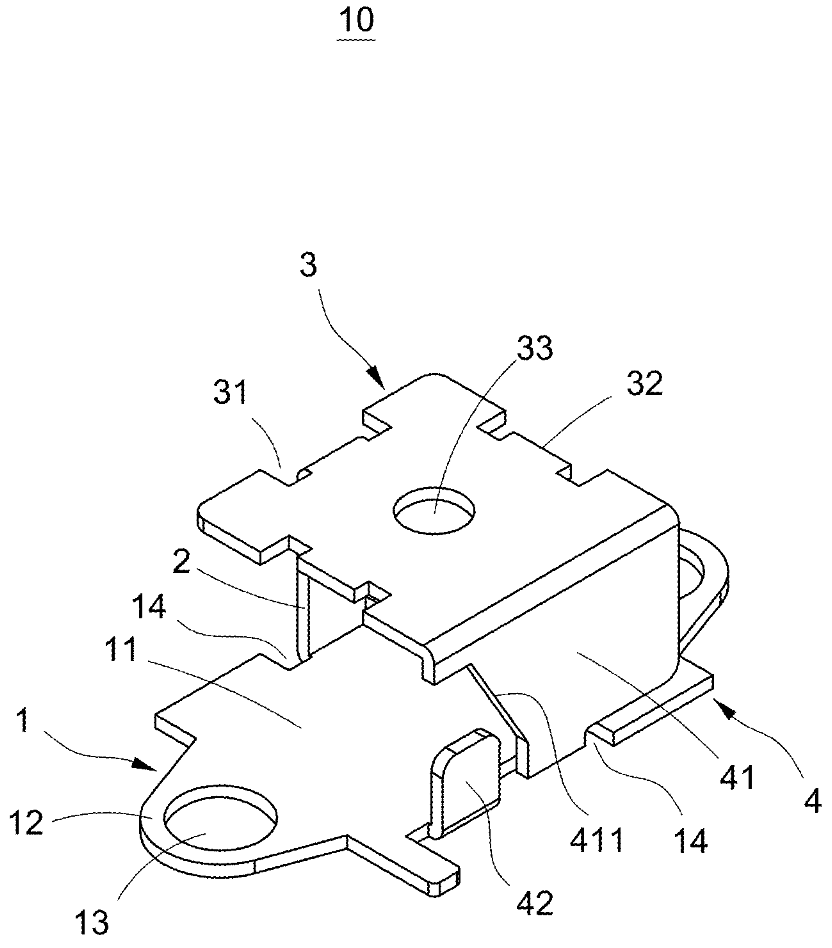
FIG. 3 shows a three-dimensional schematic diagram of the single-band antenna structure of the present disclosure.
Figure 4:
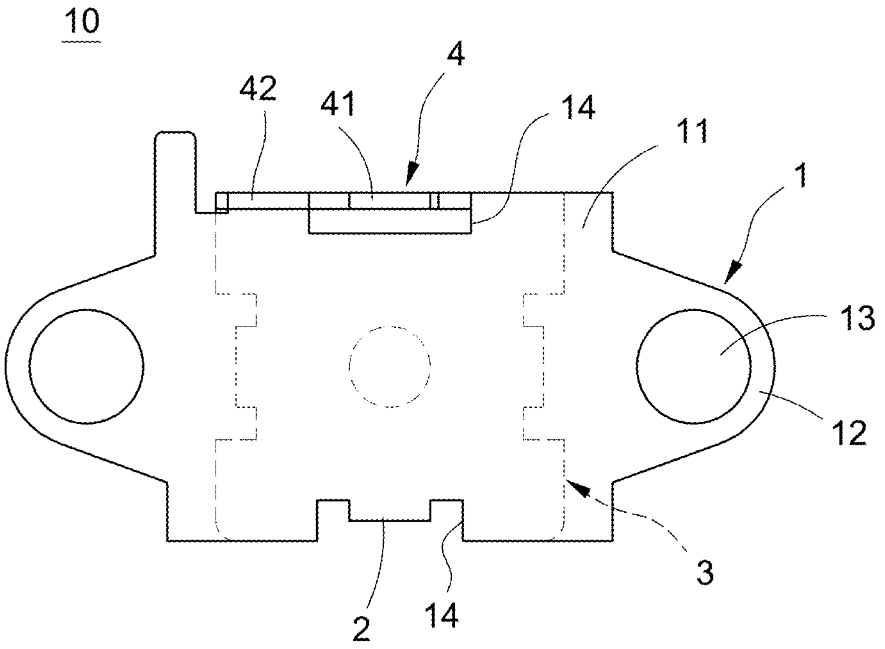
FIG. 4 shows a bottom schematic diagram of the single-band antenna structure of FIG. 3.
Figure 5:
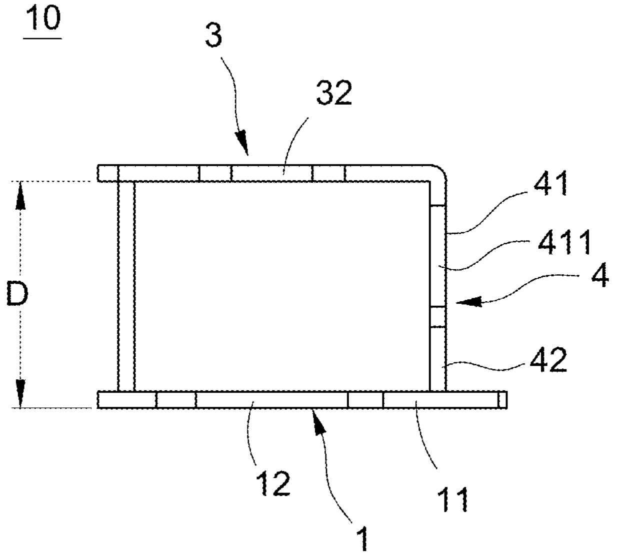
FIG. 5 shows a schematic side view of the single-band antenna structure of FIG. 3.
Figure 6:
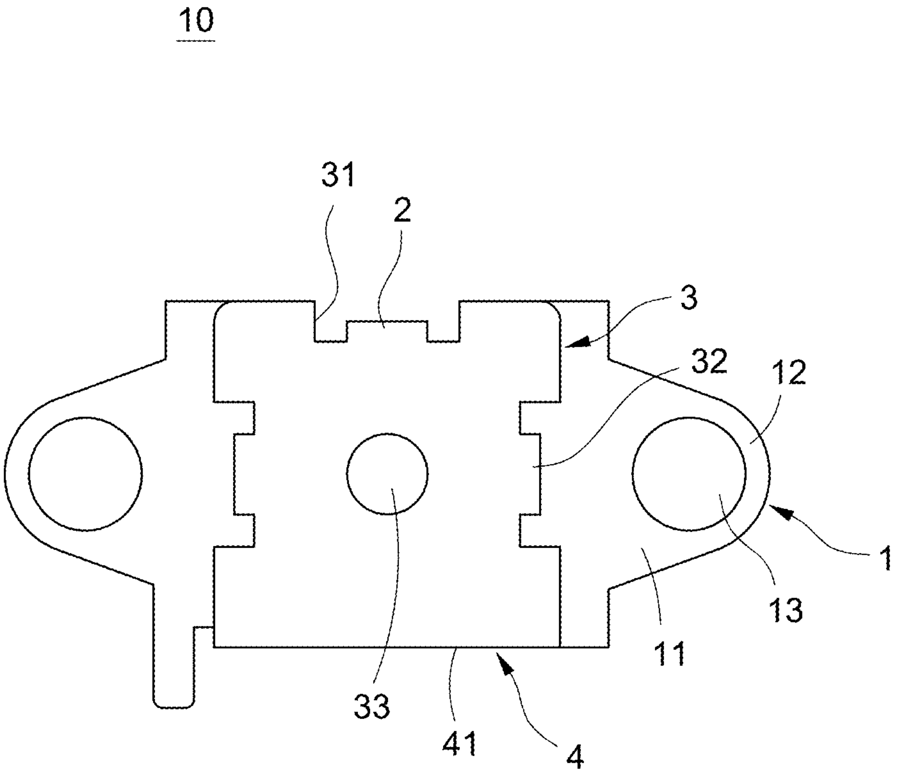
FIG. 6 shows a schematic top view of the single-band antenna structure of FIG. 3.

The technical content and detailed description of the present disclosure are now explained with the figures as follows:

FIG. 3 shows a three-dimensional schematic diagram of the single-band antenna structure of the present disclosure. FIG. 4 shows a bottom schematic diagram of the single-band antenna structure of FIG. 3. FIG. 5 shows a schematic side view of the single-band antenna structure of FIG. 3. FIG. 6 shows a schematic top view of the single-band antenna structure of FIG. 3. As shown in FIG. 3 to FIG. 6: the inverted F-shaped single-band antenna structure 10 of the present disclosure is an inverted F-shaped single-band antenna structure 10 formed by stamping a metal plate into an inverted F-shaped antenna structure through the stamping technology. The single-band antenna structure 10 includes a ground terminal 1, an impedance-matching terminal 2, a radiation terminal 3, and a signal feed-in terminal 4. Moreover, the length (height) of the impedance-matching terminal 2 is shortened to reduce the height of the antenna structure, so that the corresponding distance between the ground terminal 1 and the radiation terminal 3 is also shortened, making the inverted F-shaped dual-band antenna structure 10 may be arranged inside an electronic apparatus (not shown in FIG. 3 to FIG. 6) with limited height and space.

The ground terminal 1 includes a body 11 and two lugs 12. The two lugs 12 extend respectively from two ends of the body 11. Each of the two lugs 12 defines a perforation 13, so there are two perforations 13. The ground terminal 1 is fixed and connected inside the electronic apparatus or to a metal sheet (not shown in FIG. 3 to FIG. 6) or a circuit board (not shown in FIG. 3 to FIG. 6) through the two perforations 13. Moreover, the body 11 defines two notches 14 which are respectively on two edges of the body 11 and are symmetric to each other. In FIG. 3 to FIG. 6, the body 11 is a rectangular body.

The impedance-matching terminal (signal transmission section) 2 is bent and extended from one of the two notches 14 of the body 11 of the ground terminal 1, and is connected perpendicularly to the body 11. The purpose of the impedance-matching terminal 2 is to eliminate the reactance part of the antenna input impedance and to make the resistance part as close as possible to the characteristic impedance of the signal feed-in terminal 4.

The radiation terminal 3 is square, and is bent and extended from one side of the impedance-matching terminal 2, and is connected perpendicularly to the impedance-matching terminal 2, and is arranged correspondingly with (namely, opposite to, or mapping to) the body 11 of the ground terminal 1. Moreover, a groove 31 is defined (or formed) at a connection between the radiation terminal 3 and the impedance-matching terminal 2. The radiation terminal 3 comprises two side parts 32 which are arranged respectively on two sides of the groove 31; each of the two side parts 32 defines two symmetrical and U-shaped openings. Moreover, the radiation terminal 3 defines a through hole 33 in a center position of a surface of the radiation terminal 3. In FIG. 3 to FIG. 6, the side part 32 is arranged perpendicularly to the impedance-matching terminal 2.

It is worth mentioning that the radiation terminal 3 is single-band. A frequency of a signal of the radiation terminal 3 which is single-band is 5 GHz or 6 GHz. A (first) operating frequency range of the signal of the radiation terminal 3 with the frequency of the signal being 5 GHz is 5150 MHz to 5850 MHz; a (second) operating frequency range of the signal of the radiation terminal 3 with the frequency of the signal being 6 GHz is 5925 MHz to 7125 MHz. A corresponding distance between the radiation terminal 3 and the ground terminal 1 is about 1 mm to 9 mm. The corresponding distance D between the radiation terminal 3 and the ground terminal 1 is about 6 mm. A length (height) of the impedance-matching terminal 2 is shortened to increase the area of the radiation terminal 3 to reduce the height of the antenna, so that the inverted F-shaped single-band antenna structure 10 may be arranged and used inside the electronic apparatus with limited height and space.

The signal feed-in terminal 4 includes a first signal feed-in terminal 41 and a second signal feed-in terminal 42. The first signal feed-in terminal 41 is bent and extended from one side of the radiation terminal 3, and is connected perpendicularly to the radiation terminal 3, and is arranged on the other notch 14 of the body 11, and is arranged correspondingly with (namely, opposite to, or mapping to) the impedance-matching terminal 2, and fails to be connected to the body 11 of the ground terminal 1, and includes an oblique edge part 411 on one side of the first signal feed-in terminal 41. Moreover, the second signal feed-in terminal 42 is bent and extended from one side of the body 11 of the ground terminal 1, and is connected perpendicularly to the body 11, and is located on a same side with the first signal feed-in terminal 41, and is adjacent to the oblique edge part 411.

Figure 7:
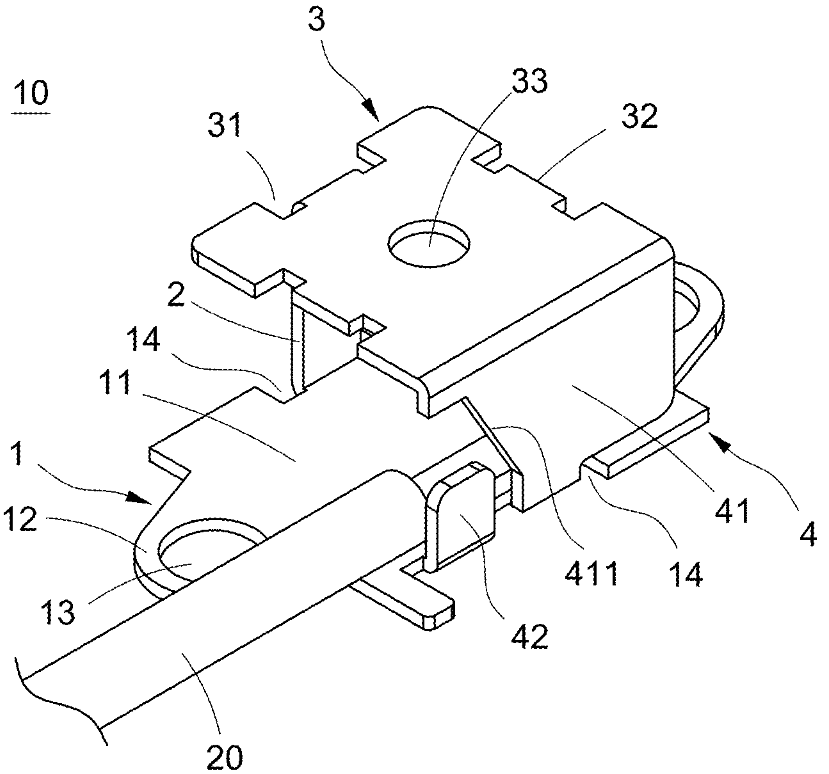
FIG. 7 shows a schematic diagram of the electrical connection of the single-band antenna structure and the cable of the present disclosure.

FIG. 7 shows a schematic diagram of the electrical connection of the single-band antenna structure and the cable of the present disclosure. As shown in FIG. 7: the single-band antenna structure 10 of the present disclosure is electrically connected to a cable 20; the cable 20 is electrically connected to the first signal feed-in terminal 41 and the second signal feed-in terminal 42 of the signal feed-in terminal 4.

Moreover, the signal (voltage) on a transmission path is transmitted from the cable 20 to the signal feed-in terminal 4, and then transmitted from the signal feed-in terminal 4 to the radiation terminal 3. A ground signal is transmitted to the ground terminal 1 through the impedance-matching terminal 2.

It may be seen from the above content that when the signal feed-in terminal 4 inputs a voltage with a corresponding frequency, for example, 5 GHz or 6 GHz, the voltage may be radiated through the radiation terminal 3. On the contrary, when receiving the electromagnetic wave with the same frequency, the electromagnetic wave with the corresponding frequency is received in a reverse manner through the radiation terminal 3, and is induced as a voltage input.

Figure 8:
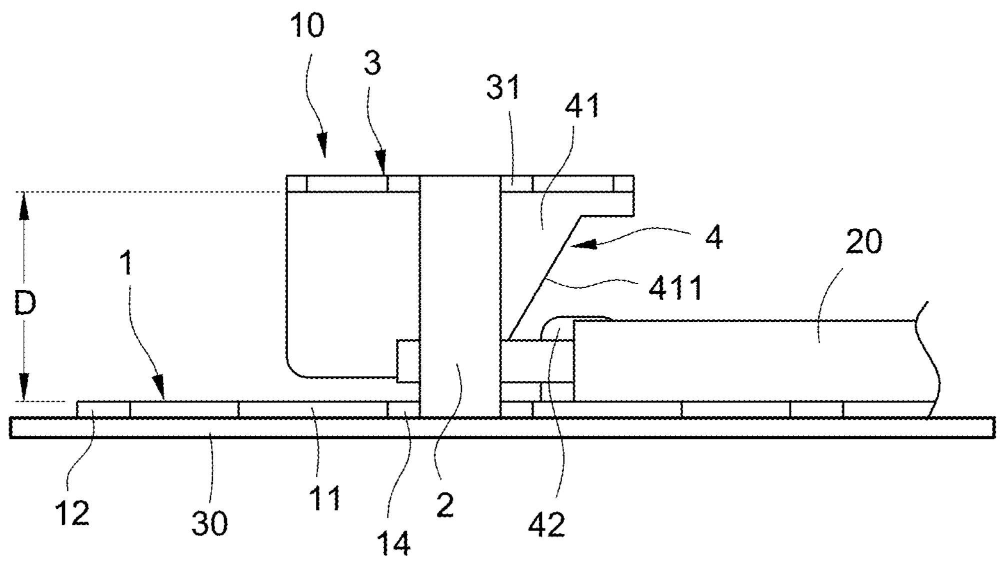
FIG. 8 shows a schematic side view of the electrical connection of the single-band antenna structure and the metal sheet (or circuit board) of the electronic apparatus of the present disclosure.

FIG. 8 shows a schematic diagram of the electrical connection of the single-band antenna structure and the circuit board of the electronic apparatus of the present disclosure. As shown in FIG. 8: after the single-band antenna structure 10 of the present disclosure is electrically fixed and connected to the metal sheet 30, the corresponding distance between the radiation terminal 3 and the ground terminal 1 which is seen from the side of the single-band antenna structure 10 is about 1 mm to 9 mm. The corresponding distance D between the radiation terminal 3 and the ground terminal 1 is about 6 mm. The length (height) of the impedance-matching terminal 2 is shortened to increase the area of the radiation terminal 3 to reduce the height of the antenna, so that the inverted F-shaped single-band antenna structure 10 may be arranged inside and used in the electronic apparatus with limited height and space.

Moreover, if the single-band antenna structure 10 of the present disclosure is mainly of the size shown in FIG. 3, a frequency of a signal applied to the single-band antenna structure 10 is GHz; an operating frequency range of the signal is 5150 MHz to 5850 MHz. If the size of FIG. 3 is reduced, a frequency of a signal applied to the single-band antenna structure 10 is 6 GHz; an operating frequency range of the signal is 5925 MHz to 7125 MHz.

However, the above descriptions are only embodiments of the present disclosure and are not intended to limit the scope of the claims of the present disclosure. Therefore, any equivalent changes made by using the contents of the specifications or drawings of the present disclosure are also included in the claims of the present disclosure, which is stated here clearly.

What is claimed is:

1. An inverted F-shaped single-band antenna structure comprising:

a ground terminal comprising a body;

an impedance-matching terminal being bent and extended from one side of the body, and connected perpendicularly to the body;

a radiation terminal being square, and bent and extended from one side of the impedance-matching terminal, and connected perpendicularly to the impedance-matching terminal, and arranged correspondingly with the body; and a signal feed-in terminal being bent and extended from one side of the radiation terminal, and connected perpendicularly to the radiation terminal, and arranged correspondingly with the impedance-matching terminal, and failing to be connected to the body;

wherein the body is a rectangular body; the ground terminal further comprises two lugs; the two lugs respectively extend from two ends of the body; each of the two lugs defines a perforation; the ground terminal is fixed and connected to a metal sheet through the two perforations; the body defines two notches respectively on two edges of the body and symmetric to each other.

2. An inverted F-shaped single-band antenna structure comprising:

a ground terminal comprising a body;

an impedance-matching terminal being bent and extended from one side of the body, and connected perpendicularly to the body;

a radiation terminal being square, and bent and extended from one side of the impedance-matching terminal, and connected perpendicularly to the impedance-matching terminal, and arranged correspondingly with the body; and a signal feed-in terminal being bent and extended from one side of the radiation terminal, and connected perpendicularly to the radiation terminal, and arranged correspondingly with the impedance-matching terminal, and failing to be connected to the body;

wherein a groove is defined at a connection between the radiation terminal and the impedance-matching terminal; the radiation terminal comprises two side parts arranged respectively on two sides of the groove; each of the two side parts defines two symmetrical and U-shaped openings; the radiation terminal defines a through hole in a center position of a surface of the radiation terminal.

3. The inverted F-shaped single-band antenna structure of claim 2, wherein the two side parts are arranged perpendicularly to the impedance-matching terminal.

4. The inverted F-shaped single-band antenna structure of claim 3, wherein a frequency of a signal of the radiation terminal is 5 GHz or 6 GHz.

5. The inverted F-shaped single-band antenna structure of claim 4, wherein a first operating frequency range of the signal of the radiation terminal with the frequency of the signal being 5 GHz is 5150 MHz to 5850 MHz; a second operating frequency range of the signal of the radiation terminal with the frequency of the signal being 6 GHz is 5925 MHz to 7125 MHz.

6. The inverted F-shaped single-band antenna structure of claim 1, wherein a corresponding distance between the radiation terminal and the ground terminal is about 1 mm to 9 mm.

7. The inverted F-shaped single-band antenna structure of claim 6, wherein the corresponding distance between the radiation terminal and the ground terminal is about 6 mm.

8. The inverted F-shaped single-band antenna structure of claim 1, wherein the signal feed-in terminal comprises a first signal feed-in terminal; the first signal feed-in terminal is bent and extended from one side of the radiation terminal, and is connected perpendicularly to the radiation terminal, and is arranged on one of the two notches of the body, and is arranged correspondingly with the impedance-matching terminal, and fails to be connected to the body of the ground terminal, and includes an oblique edge part on one side of the first signal feed-in terminal.

9. The inverted F-shaped single-band antenna structure of claim 8, wherein the signal feed-in terminal further comprises a second signal feed-in terminal; the second signal feed-in terminal is bent and extended from one side of the body of the ground terminal, and is connected perpendicularly to the body, and is located on a same side with the first signal feed-in terminal, and is adjacent to the oblique edge part.

10. The inverted F-shaped single-band antenna structure of claim 2, wherein a corresponding distance between the radiation terminal and the ground terminal is about 1 mm to 9 mm.

11. The inverted F-shaped single-band antenna structure of claim 10, wherein the corresponding distance between the radiation terminal and the ground terminal is about 6 mm.

* * * * *